US011230994B2

(12) United States Patent
Tweedie (10) Patent No.: US 11,230,994 B2
(45) Date of Patent: Jan. 25, 2022

(54) NACELLE WITH THRUST REVERSER

(71) Applicant: SHORT BROTHERS PLC, Belfast (GB)

(72) Inventor: Alan Tweedie, Dromore Down (GB)

(73) Assignee: SHORT BROTHERS PLC, Belfast (GB)

( * ) Notice: Subject to any disclaimer, the term of this patent is extended or adjusted under 35 U.S.C. 154(b) by 64 days.

(21) Appl. No.: 16/632,780

(22) PCT Filed: Jul. 25, 2018

(86) PCT No.: PCT/GB2018/052089
§ 371 (c)(1),
(2) Date: Jan. 21, 2020

(87) PCT Pub. No.: WO2019/020995
PCT Pub. Date: Jan. 31, 2019

(65) Prior Publication Data
US 2021/0156338 A1 May 27, 2021

(30) Foreign Application Priority Data
Jul. 26, 2017 (GB) ..................................... 1712056

(51) Int. Cl.
*F02K 1/72* (2006.01)
*F02K 1/12* (2006.01)
*F02K 1/56* (2006.01)

(52) U.S. Cl.
CPC .................. *F02K 1/72* (2013.01); *F02K 1/12* (2013.01); *F02K 1/56* (2013.01); *F05D 2250/40* (2013.01); *F05D 2260/606* (2013.01)

(58) Field of Classification Search
CPC ..... F02K 1/70; F02K 1/72; F02K 1/12; F02K 1/56
See application file for complete search history.

(56) References Cited

U.S. PATENT DOCUMENTS

| 5,103,634 A | 4/1992 | Harrison et al. |
| 5,197,693 A * | 3/1993 | Remlaoui ................. F02K 1/70 244/110 B |

(Continued)

FOREIGN PATENT DOCUMENTS

| EP | 3081796 A1 | 10/2016 |
| GB | 1345337 | 1/1974 |
| WO | 2015101758 A1 | 7/2015 |

OTHER PUBLICATIONS

United Kingdom Search Report dated Jan. 19, 2018, for United Kingdom Patent Application No. GB 1712056.9.
(Continued)

*Primary Examiner* — Craig Kim
(74) *Attorney, Agent, or Firm* — Hovey Williams LLP (57) ABSTRACT

A nacelle for an aircraft having a thrust reverser including a translating cowl and a blocking panel. The blocking panel is connected by a pivot connection and is connected to the translating cowl by a sliding connection including an engagement member slidingly engaged in a track, the track having a first portion parallel to the longitudinal axis of the outer casing and a second portion non-parallel to the longitudinal axis. Motion of the translating cowl along the longitudinal axis slides the engagement member within the track, and is performed without moving the blocking panel when the engagement member is within the first portion of the track. The motion of the translating cowl causes the blocking panel to pivot about the pivot connection when the engagement member is within the second portion of the track.

18 Claims, 9 Drawing Sheets

(56) References Cited

U.S. PATENT DOCUMENTS

| | | | | |
|---|---|---|---|---|
| 5,863,014 A | * | 1/1999 | Standish | F02K 1/70 |
| | | | | 244/110 B |
| 5,983,625 A | * | 11/1999 | Gonidec | F02K 1/70 |
| | | | | 60/226.2 |
| 6,076,347 A | * | 6/2000 | Gonidec | F02K 1/70 |
| | | | | 239/265.29 |
| 6,082,096 A | * | 7/2000 | Vauchel | F02K 1/70 |
| | | | | 239/265.29 |
| 6,151,886 A | * | 11/2000 | Vauchel | F02K 1/70 |
| | | | | 60/226.2 |
| 6,158,211 A | * | 12/2000 | Gonidec | F02K 1/70 |
| | | | | 60/226.2 |
| 8,109,468 B2 | | 2/2012 | Andre et al. | |
| 9,482,181 B2 | | 11/2016 | Hurlin et al. | |
| 9,518,534 B2 | | 12/2016 | Kusel | |
| 9,534,562 B2 | | 1/2017 | Biset | |
| 9,915,226 B2 | * | 3/2018 | Gormley | F02K 1/72 |
| 2004/0068978 A1 | * | 4/2004 | Lair | F02K 1/763 |
| | | | | 60/226.2 |
| 2012/0067975 A1 | * | 3/2012 | Vauchel | F02K 1/72 |
| | | | | 239/265.33 |
| 2014/0150404 A1 | | 6/2014 | Gallet | |
| 2016/0108852 A1 | | 4/2016 | Caruel | |
| 2016/0115902 A1 | | 4/2016 | Kerbler et al. | |
| 2016/0160799 A1 | | 6/2016 | Gormley | |
| 2016/0245228 A1 | | 8/2016 | Gormley | |
| 2016/0369744 A1 | | 12/2016 | Gormley | |
| 2017/0328304 A1 | * | 11/2017 | Gormley | F02K 1/72 |
| 2018/0258881 A1 | * | 9/2018 | Schaefer | F02K 1/60 |

OTHER PUBLICATIONS

International Search Report and Written Opinion dated Jan. 2, 2019, for International Patent Application No. PCT/GB2018/052089.

\* cited by examiner

NACELLE WITH THRUST REVERSER

CROSS-REFERENCE TO RELATED APPLICATION(S)

This is a National Stage Entry into the United States Patent and Trademark Office from International PCT Patent Application No. PCT/GB2018/052089, having an international filing date of Jul. 25, 2018, and which claims priority from UK Patent Application No. 1712056.9, filed on Jul. 26, 2017, the entire contents of both of which are incorporated herein by reference.

TECHNICAL FIELD

This application relates generally to aircraft engine nacelles and, more particularly, to thrust reversers provided in such nacelles.

BACKGROUND OF THE ART

Thrust reversers typically include movable blocking panels which are moved to prevent at least part of the bypass flow from being expelled through the engine aft exhaust aperture and to re-direct the bypass flow forwardly through an aperture created by a translating cowl. Known thrust reversers include drag links supporting and guiding the motion of the blocking panels within the bypass passage. The drag links can define complex assemblies, and may also protrude within the bypass passage during normal flight thus resulting in unwanted drag losses.

Some conventional blocking panels are located on the inner surface of the translating cowl and accordingly exposed to the bypass flow when stowed. Such blocking panels may accordingly impact the aerodynamic flow efficiency in the bypass passage, for example due to steps and gaps defined between and around the panels.

SUMMARY

In one aspect, there is provided a nacelle for an aircraft, comprising: an outer casing having a longitudinal axis; a thrust reverser including: a translating cowl, the outer casing and translating cowl cooperating to define an outer boundary of a bypass passage configured to surround an engine, the translating cowl movable relative to the outer casing along the longitudinal axis between a closed position and an open position, the translating cowl in the open position being axially spaced from the outer casing so as to define an opening between the translating cowl and the outer casing; and a blocking panel pivotable about a pivot connection between a stowed position and a pivoted position, the blocking panel in the pivoted position extending within the bypass passage adjacent the opening to direct a flow toward the opening; wherein the blocking panel is connected to the translating cowl by a sliding connection including an engagement member slidingly engaged in a track, the track having a first portion parallel to the longitudinal axis and a second portion non-parallel to the longitudinal axis; wherein motion of the translating cowl along the longitudinal axis slides the engagement member within the track, the motion of the translating cowl being performed without moving the blocking panel when the engagement member is within the first portion of the track, the motion of the translating cowl causing the blocking panel to pivot about the pivot connection when the engagement member is within the second portion of the track.

In particular embodiments, the nacelle may include any one or any suitable combination of the following:

the translating cowl abuts the outer casing when in the closed position;

the blocking panel is connected to the outer casing by the pivot connection;

the blocking panel is located radially outwardly of the bypass passage when in the stowed position;

the blocking panel extends in part within the translating cowl and in part within the outer casing when the blocking panel is in the stowed position and the translating cowl is in the closed position;

the track is connected to the blocking panel and the engagement member protrudes from the translating cowl, the second portion of the track extending from the first portion toward the longitudinal axis;

the track is connected to the translating cowl and the engagement member protrudes from the blocking panel, the second portion of the track extending from the first portion away from the longitudinal axis;

the blocking panel is arcuate, the pivot connection including two circumferentially spaced pivots defining a pivot axis orthogonal to the longitudinal axis, the sliding connection being positioned circumferentially between the two pivots;

the pivot connection is located radially outwardly of the bypass passage;

the pivot connection is located aft of the track when the blocking panel is in the stowed position;

the blocking panel protrudes through the opening when the blocking panel is in the pivoted position;

the blocking panel includes a forward end and a rear end, the forward end being located radially outwardly of the rear end when the blocking panel is in the pivoted position.

In another aspect, there is provided a nacelle for an aircraft, comprising: an outer casing having a longitudinal axis; a translating cowl cooperating with the outer casing to define an outer boundary of a bypass passage configured to surround an engine, the translating cowl movable relative to the outer casing along the longitudinal axis; a blocking panel connected to the outer casing by a pivot connection and connected to the translating cowl by a sliding connection, the sliding connection including an engagement member slidingly engaged in a track, the track having a first portion parallel to the longitudinal axis and a second portion non-parallel to the longitudinal axis; wherein the translating cowl and the blocking panel define at least part of a thrust reverser selectively configurable between: a closed configuration where the translating cowl abuts the outer casing, the blocking panel has a stowed position radially outwardly of the bypass passage, and the engagement member is located in the first portion of the track, a deployed configuration where the translating cowl is spaced a first distance from the outer casing so as to define an opening therebetween, the blocking panel has a pivoted position within the bypass passage adjacent the opening to direct a flow toward the opening, and the engagement member is located in the second portion of the track, the blocking panel pivoting about the pivot connection to move between the stowed and pivoted positions, and an intermediate configuration between the closed and deployed configurations, wherein in the intermediate configuration, the translating cowl is spaced a second distance smaller than the first distance from the outer casing, the blocking panel is in the stowed position, and the engagement member is located at a junction between the first and second portions of the track.

In particular embodiments, the nacelle may include any one or any suitable combination of the following:

the track is connected to the blocking panel and the engagement member protrudes from the translating cowl, the second portion of the track extending from the first portion toward the longitudinal axis;

the track is connected to the translating cowl and the engagement member protrudes from the blocking panel, the second portion of the track extending from the first portion away from the longitudinal axis;

the blocking panel is arcuate, the pivot connection including two circumferentially spaced pivots defining a pivot axis orthogonal to the longitudinal axis, the sliding connection being positioned circumferentially between the two pivots;

the pivot connection is located radially outwardly of the bypass passage;

the pivot connection is located aft of the track when the blocking panel is in the stowed position;

the blocking panel protrudes through the opening when the blocking panel is in the pivoted position;

the blocking panel extends in part between walls of the translating cowl and in part between walls of the outer casing when the thrust reverser is in the closed configuration.

In a further aspect, there is provided a nacelle for an aircraft, comprising: an outer casing defining an outer wall of a portion of a bypass passage, the bypass passage configured to surround an engine; a translating cowl movable axially in relation to the outer casing between a closed position and an open position, wherein in the open position an opening is defined between the outer casing and the translating cowl; and a blocking panel comprising a forward end and a rear end, the blocking panel being pivotable between a stowed position and a pivoted position; wherein in the pivoted position: the blocking panel extends within the bypass passage adjacent the opening to direct a flow toward the opening; and the forward end of the blocking panel is located radially outwardly of the rear end.

In a further aspect, there is provided a method of deploying a thrust reverser for an aircraft engine, the thrust reverser including a translating cowl and a blocking panel slidingly interconnected by an engagement member received in a track, the method comprising: moving the translating cowl away from an outer casing along a longitudinal axis of the outer casing until the translating cowl reaches an open position, the outer casing and translating cowl defining an outer boundary of a bypass passage surrounding the engine, wherein moving the translating cowl includes: moving the translating cowl away from the outer casing without moving the blocking panel relative to the outer casing until the translating cowl reaches an intermediate position and while the engagement member slides in a portion of the track parallel to the longitudinal axis; and moving the translating cowl away from the outer casing from the intermediate position to the open position to pivot the blocking panel by sliding the engagement member in a second portion of the track non-parallel to the longitudinal axis, the blocking panel pivoting to a position where the blocking panel extends within the bypass passage to direct a flow radially outwardly toward an opening between the translating cowl and the outer casing.

In particular embodiments, the method may include any one or any suitable combination of the following:

the blocking panel pivots about a pivot connection located radially outwardly of the bypass passage;

the translating cowl moves rearwardly away from the outer casing, and the pivot connection is located on a rear end of the blocking panel;

the blocking panel pivots until the blocking panel protrudes through the opening between the translating cowl and the outer casing;

the blocking panel remains radially outward of the bypass passage as the translating cowl moves between the closed and intermediate positions.

DESCRIPTION OF THE DRAWINGS

For a better understanding of the present invention, as well as other aspects and further features thereof, reference is made to the following description which is to be used in conjunction with the accompanying drawings, where.

In the drawings, embodiments of the invention are illustrated by way of example. It is to be expressly understood that the description and drawings are only for purposes of illustration and as an aid to understanding. They are not intended to be a definition of the limits of the invention

DETAILED DESCRIPTION

Figure 1:
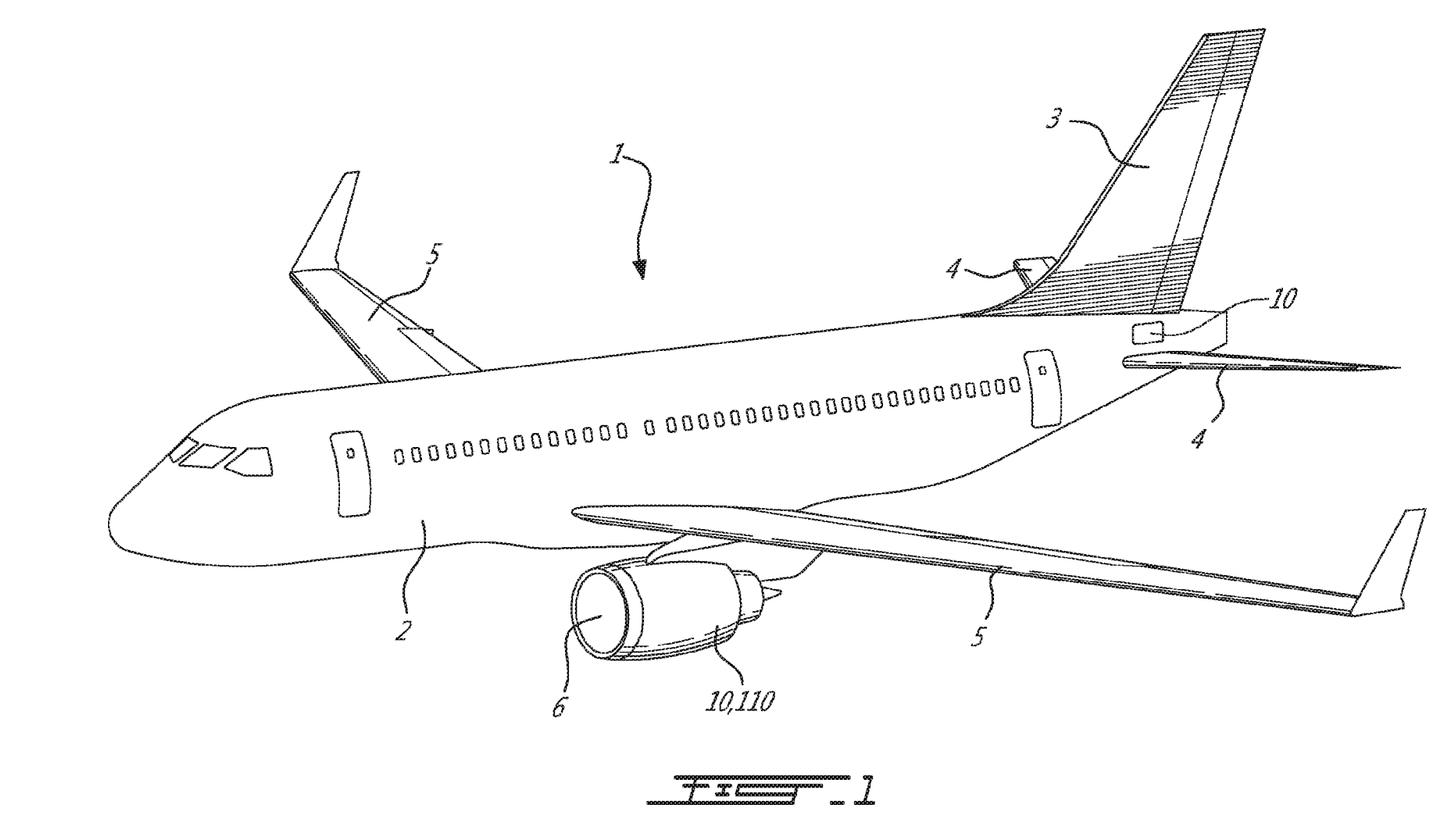
FIG. 1 is a schematic tridimensional view of an aircraft in accordance with a particular embodiment.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 contained in nacelles 10, 110 supported by the wings 5, although the nacelles 10, 110 could also be mounted to the fuselage 2. Each nacelle 10, 110 defines an aerodynamic outer surface around the engine 6 and may also define air passages in communication with the engine 6. Although two engines 6 are shown, it is understood that the aircraft 2 can have a single engine or more than two engines.

Figure 2:
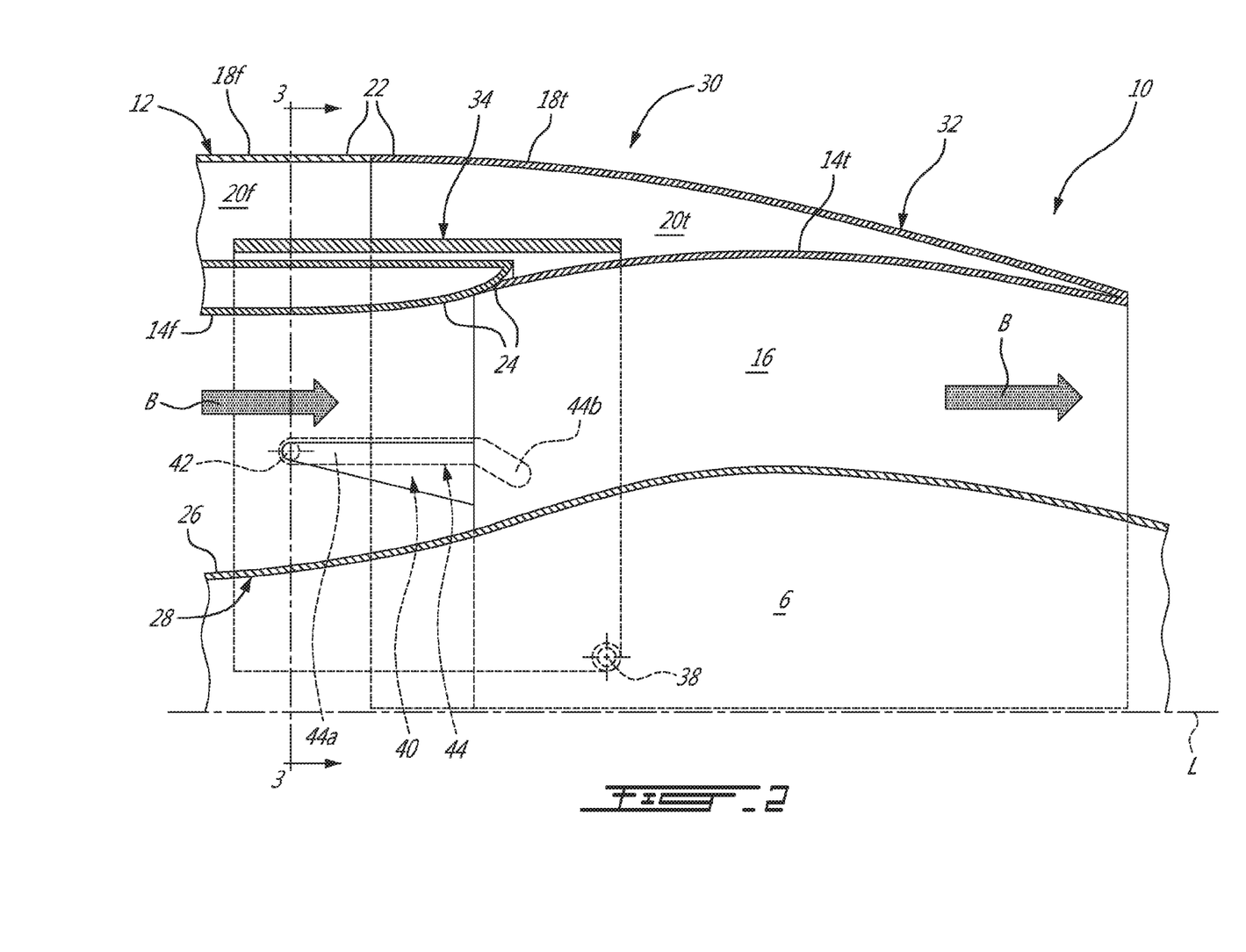
FIG. 2 is a schematic side cross-sectional view of part of a nacelle of an aircraft such as shown in FIG. 1, including a thrust reverser in accordance with a particular embodiment, the thrust reverser being in a closed configuration.
Figure 3:
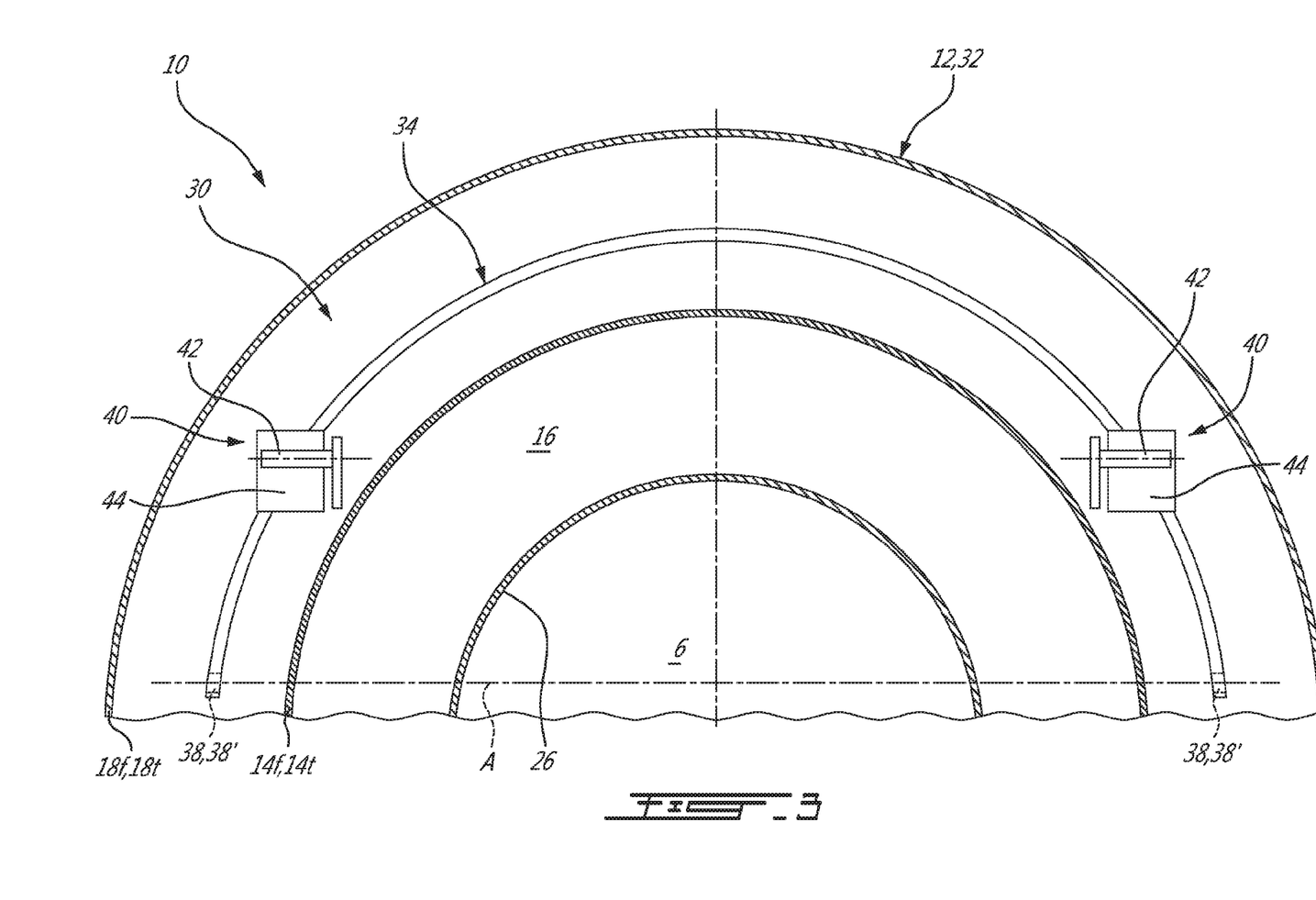
FIG. 3 is a schematic rear cross-sectional view of the nacelle with the thrust reverser in the closed configuration, taken along line 3-3 in FIG. 2.

Referring to FIGS. 2-3, a nacelle 10 in accordance with a particular embodiment is partially shown. The nacelle 10 includes an outer casing 12 which is annular and has a longitudinal axis L. The outer casing 12 has an annular outer wall 14*f* which surrounds an upstream portion of an annular bypass passage 16 defined around the engine (not shown, but the location of which being identified at 6); the bypass passage 16 may be configured for example to receive a flow of air driven by a fan of the engine and bypassing the engine core, and mixed with the engine exhaust downstream of combustion. The outer casing 12 also includes an annular exterior wall 18*f* radially outwardly spaced from the outer wall 14*f* so that a cavity 20*f* is defined between the outer wall 14*f* and the exterior wall 18*f*. In a particular embodiment, the exterior wall 18*f* defines part of the outer surface 22 of the nacelle 10 exposed to the atmosphere. The outer wall 14*f* defines an outer boundary 24 of the bypass passage 16 and is exposed to the bypass flow B circulating through the bypass passage 16. An inner wall 26 of the bypass passage 16 is defined by an annular inner casing 28 located radially inwardly of the outer wall 14*f*. The inner casing 28 separates the bypass flow B from the engine 6, so as to separate the bypass flow B from the main combustion flow.

In the embodiment shown, the outer casing 12 is a fixed structure, i.e. it has a fixed position relative to the inner casing 28 and with respect to the engine 6. The outer casing 12 and inner casing 28 may be interconnected through any suitable type of connection (not shown).

Figure 4:
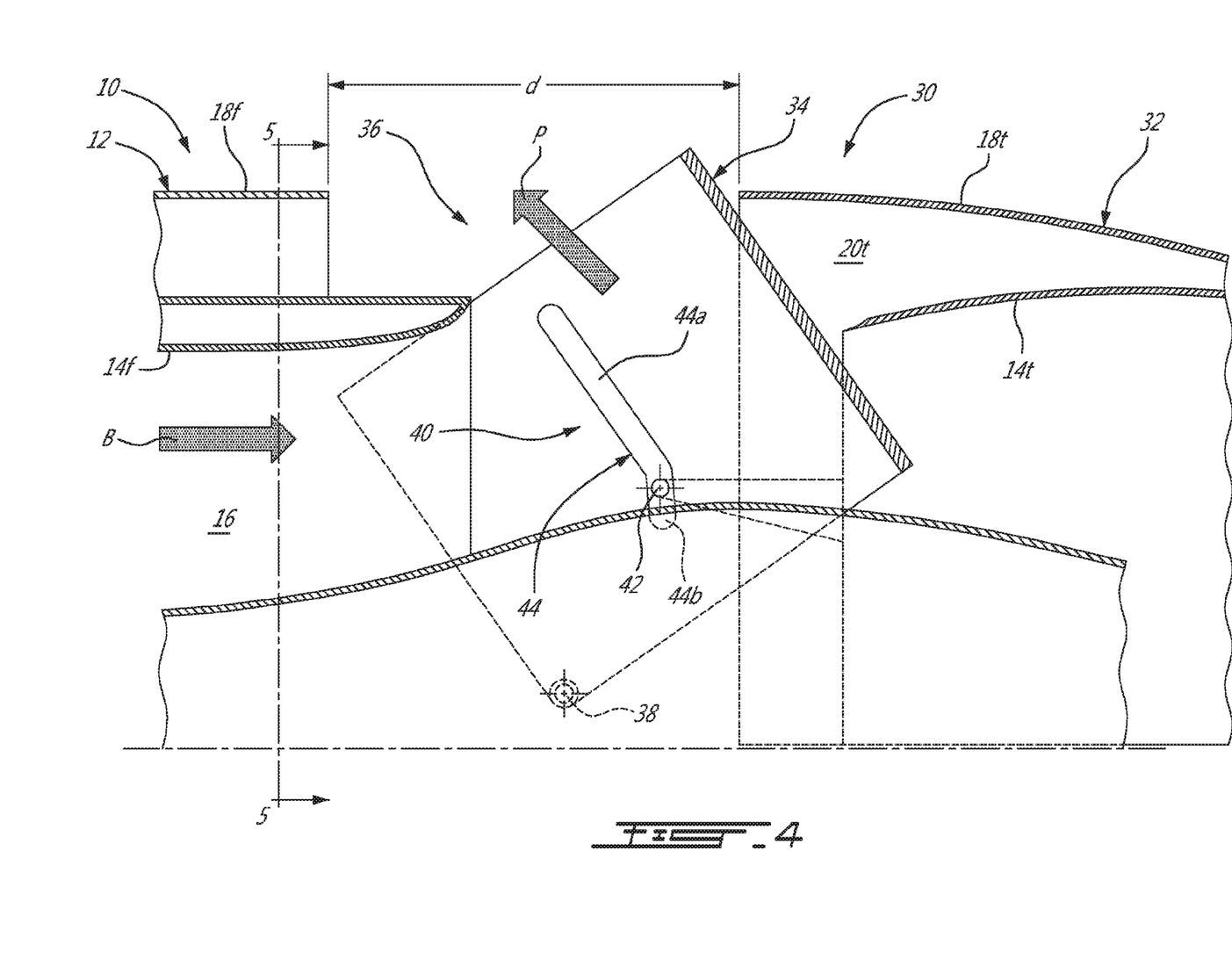
FIG. 4 is a schematic side cross-sectional view of the nacelle of FIGS. 2-3, showing the thrust reverser in a deployed configuration.
Figure 5:
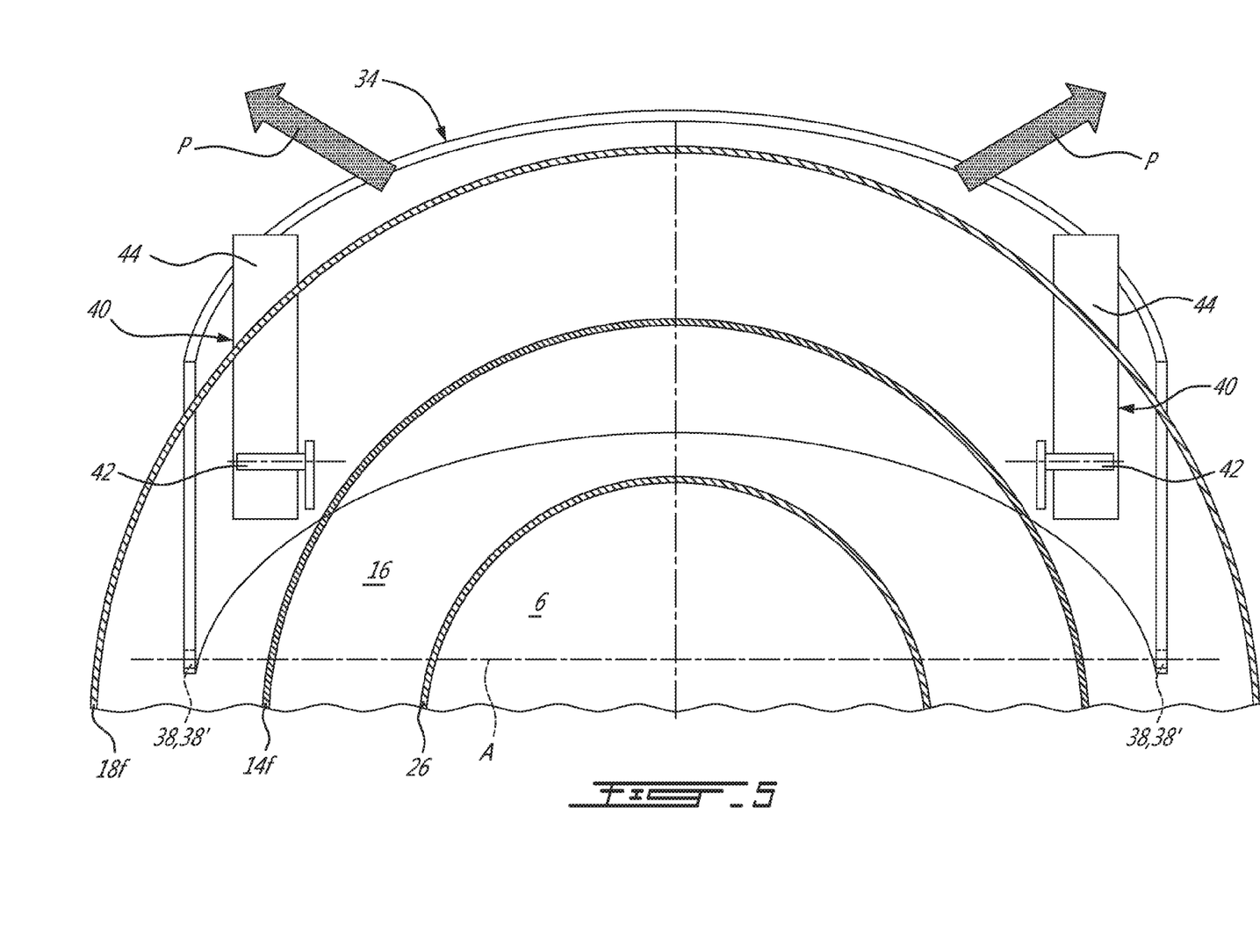
FIG. 5 is a schematic rear cross-sectional view of the nacelle with the thrust reverser in the deployed configuration, taken along line 5-5 in FIG. 4.

The nacelle 10 includes a thrust reverser 30 which is shown in FIGS. 2-3 in a closed configuration and in FIGS. 4-5 in a deployed configuration. In the deployed configuration, the thrust reverser 30 is configured to redirect a portion P of the bypass flow B toward the front of the nacelle 10 (left side of FIG. 4) so as to provide a reversed thrust to slow down the aircraft. The thrust reverser 30 generally includes one or more translating cowl(s) 32 and one or more blocking panel(s) 34, one of each being shown in the Figures. In a particular embodiment and as can be best seen in FIG. 3, each translating cowl 32 and each blocking panel 34 extends around an arc of about 180 degrees; the other half of the nacelle 10 not shown in the Figure is a mirror image of the portion shown, so that the thrust reverser 30 includes two translating cowls 32 and two blocking panels 34. It is understood that alternately the thrust reverser 30 may include a single translating cowl 32 and/or a single blocking panel 34, or more than two translating cowls 32 and/or blocking panels 34, each spanning across a respective arc of the nacelle 10 sufficient to provide a desired reversed thrust when deployed.

The translating cowl 32 has an arcuate outer wall 14*t* which surrounds a downstream portion of the bypass passage 16. The translating cowl 32 also includes an arcuate exterior wall 18*t* concentric with and radially outwardly spaced from the outer wall 14*t* so that a cavity 20*t* is defined between the outer wall 14*t* and the exterior wall 18*t*. The translating cowl 32 is movable along the longitudinal axis L between a closed position (FIGS. 2-3) and an open position (FIG. 4-5). In the closed position and as can be best seen in FIG. 2, the translating cowl 32 abuts the outer casing 12, with the outer walls 14*f*, 14*t* of the outer casing 12 and translating cowl 32 cooperating to define a continuous outer boundary 24 of the bypass passage 16 exposed to the bypass flow B, and with the exterior walls 18*f*, 18*t* of the outer casing 12 and translating cowl 32 cooperating to define a continuous outer surface 22 of the nacelle 10 exposed to atmosphere.

In the open position and as can be best seen in FIG. 4, the translating cowl 32 is axially spaced from the outer casing 12 so as to define an opening 36 therebetween, created by the space between the outer walls 14*f*, 14*t* and the corresponding space between the exterior walls 18*f*, 18*t* (illustrated by distance d). At least a portion P of the bypass flow B escapes the bypass passage 16 and the nacelle 10 through the opening 36. Although not shown, it is understood that suitable vanes (for example, extending rearwardly from the outer casing 12 and received in the cavity 20*t* of the translating cowl 32 when the translating cowl 32 is in the closed position) can be provided across the opening 36, so as to help direct the flow toward the front of the nacelle 10.

The blocking panel 34 is connected to the outer casing 12 by a pivot connection 38. In the embodiment shown, the pivot connection 38 is defined at the rear end of the blocking panel 34. As can be best seen in FIGS. 3 and 5, in the embodiment shown the pivot connection 38 includes two spaced apart pivots 38' defining a pivot axis A orthogonal to the longitudinal axis L; it is understood that alternately, a single pivot or more than two pivots can be provided, for example depending on the size of the blocking panel 34. The pivot connection 38 (e.g., pivots 38') is located radially outwardly of the outer walls 14*f*, 14*t* and radially outwardly of the bypass passage 16. The pivot connection 38 (e.g., pivots 38') is also located radially inwardly of the exterior walls 18*f*, 18*t*, so as to be contained within the cavity 20*f*, 20*t* of the outer casing 12 and/or of the translating cowl 32.

The blocking panel 34 is pivotable about the pivot connection 38 between a stowed position (FIGS. 2-3) and a pivoted position (FIGS. 4-5). In the embodiment shown, in the stowed position and as can be best seen in FIG. 3, the blocking panel 34 is located radially outwardly of the outer walls 14*f*, 14*t* and of the bypass passage 16. The blocking panel 34 is also located radially inwardly of the exterior walls 18*f*, 18*t*, so as to be contained within the cavity 20*f*, 20*t* of the outer casing 12 and/or of the translating cowl 32. As can be best seen in FIG. 2, in the embodiment shown, the blocking panel 34 extends in part within the cavity 20*t* of the translating cowl 32 and in part within the cavity 20*f* of the outer casing 12 when the blocking panel 34 is in the stowed position and the translating cowl 32 is in the closed position; in other words, the blocking panel 34 extends in part within the translating cowl 32 and in part within the outer casing 12 when the thrust reverser 30 is in the closed configuration.

In the pivoted position and as can be best seen in FIG. 4, the blocking panel 34 extends within the bypass passage 16 adjacent the opening 36 to direct at least a portion P of the bypass flow B toward and out of the opening 36. In the embodiment shown, the blocking panel 34 in the pivoted position is angled so that its forward end is located radially outwardly of its rear end, and the blocking panel 34 protrudes through the opening 36, i.e. part of the blocking panel 34 extends radially outwardly of at least the outer walls 14*f*, 14*t*, and in a particular embodiment also extends radially outwardly of the exterior walls 18*f*, 18*t*. Other configurations are possible.

As can be best seen in FIGS. 2 and 4, the blocking panel 34 is also connected to the translating cowl 32, by a sliding connection 40 including an engagement member 42 slidingly engaged in a track 44. It is understood that the term "track" as used herein is intended to encompass any suitable structure allowing to slidingly receive and guide a sliding movement of a complementary engagement member, including, but not limited to, a slot defined in a structure configured to slidingly receive and guide the complementary engagement member, and two spaced apart rails protruding from a structure with the space between the rails being configured to slidingly receive and guide the complementary engagement member. In a particular embodiment, the engagement member is a spigot; it is however understood that the engagement member may have any suitable shape.

The pivot connection 38 is located aft of the track 44 when the blocking panel 34 is in the stowed position. In the embodiment shown, the sliding connection 40 includes two tracks 44 and two engagement members 42; each track 44 is connected to the blocking panel 34 and each engagement member 42 protrudes from the translating cowl 32. As can be best seen in FIGS. 3 and 5, in the embodiment shown the tracks 44 are circumferentially spaced from each other, and circumferentially located between the two pivots 38'. Other configurations are also possible.

Referring back to FIGS. 2 and 4, it can be seen that the track 44 has a first portion 44a parallel to the longitudinal axis L and a second portion 44b non-parallel to the longitudinal axis L. In the embodiment shown, the second portion 44b extends from the first portion 44a toward the longitudinal axis L, and is located rearwardly of the first portion 44a. The engagement member 42 is received in the first portion 44a of the track when the thrust reverser 30 is in the closed configuration (FIGS. 2-3) and in the second portion 44b of the track when the thrust reverser 30 is in the deployed configuration (FIGS. 4-5).

In use, the configuration of the thrust reverser 30 is changed through the sliding motion of the translating cowl 32, which may be driven by any suitable type of actuation mechanism (not shown), including, but not limited to, linearly extending hydraulic actuators. The sliding motion of the translating cowl 32 causes the pivoting motion of the blocking panel 34 about the pivot connection 38 due to the sliding connection 40, which is configured so that the translating cowl 32 causes pivoting of the blocking panel 34 during only part of the motion of the translating cowl 32, as described in the following.

Figure 6A:
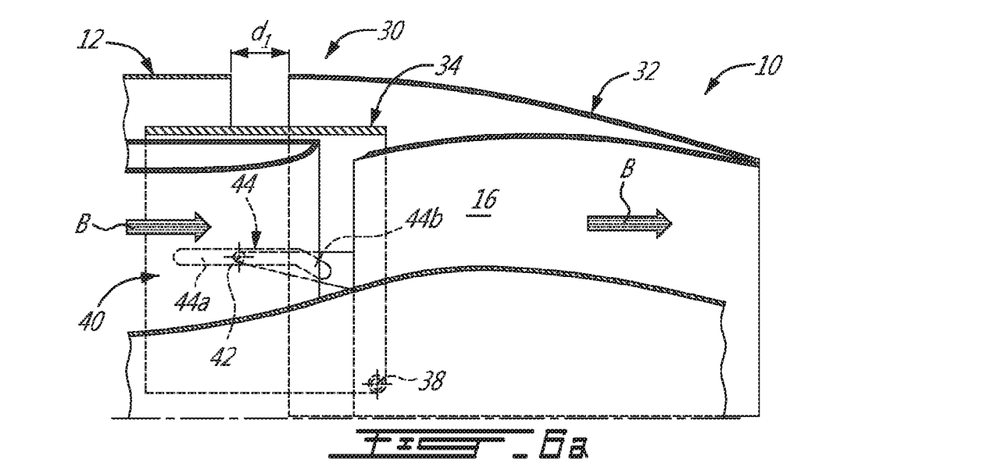
FIGS. 6a-6c are schematic side cross-sectional views of the nacelle of FIGS. 2-5, showing successive configurations of the thrust reverser intermediate the closed and deployed configurations.
Figure 6B:
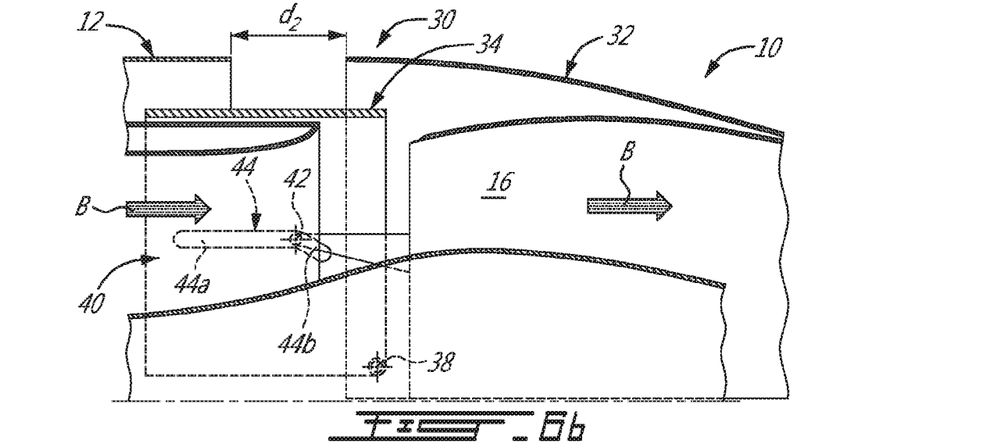
Figure 6C:
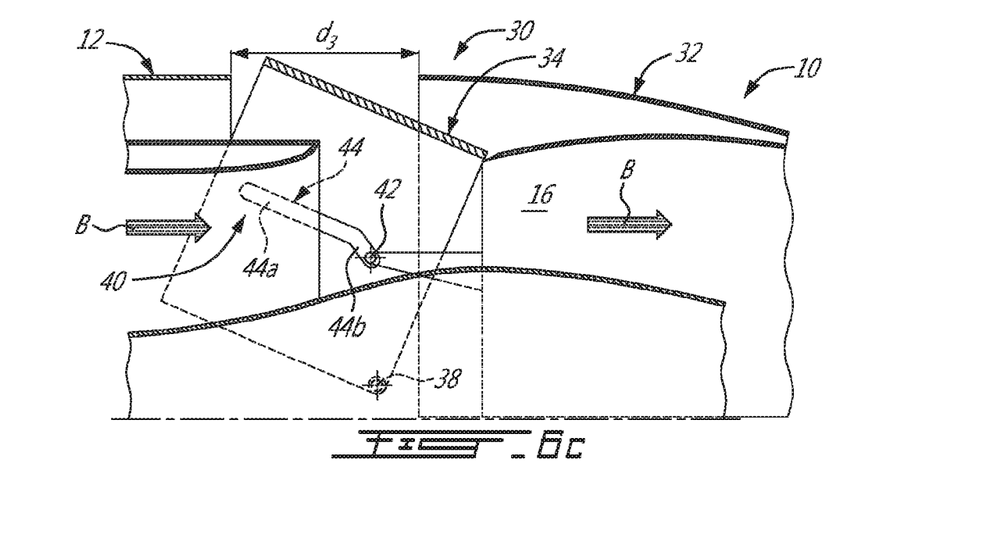

FIGS. 6a to 6c show the thrust reverser 30 in successive intermediate configurations between the closed configuration of FIG. 2 and the deployed configuration of FIG. 5, representing for example the position of the translating cowl 32 and of the blocking panel 34 when the translating cowl 32 is located at 25% (FIG. 6a), 50% (FIG. 6b) and 75% (FIG. 6c) of its maximum distance d (FIG. 4) from the outer casing 12, i.e. d1 (FIG. 6a)=0.25d, d2 (FIG. 6b)=0.5d and d3 (FIG. 6c)=0.75d; other values are also possible. The motion of the translating cowl 32 along the longitudinal axis L slides the engagement member 42 within the track 44. It can be seen from the comparison of FIGS. 2, 6a and 6b that the motion of the translating cowl 32 is performed without moving the blocking panel 34 when the engagement member 42 slides within the first, longitudinal portion 44a of the track 44, i.e. the blocking panel 34 remains in the stowed position. Between a predetermined intermediate configuration where the engagement member 42 is at the junction of the first and second portions 44a, 44b (FIG. 6b) and the deployed configuration, as can be seen from the comparison of FIGS. 6b, 6c and 4, the motion of the translating cowl 32 causes the blocking panel 34 to pivot about the pivot connection 40 between the stowed and pivoted positions when the engagement member 42 slides within the second, angled portion 44b of the track 44. The pivoting motion of the blocking panel 34 is guided by the interaction between the engagement member 42 and the walls of the track 44. The engagement member 42 slides in the second portion 44b of the track 44 first toward the end of the track 44, i.e. away from the first portion 44a, and then back toward the first portion 44a, while remaining within the second portion 44b, as the blocking panel 34 pivots from the stowed to the pivoted positions.

Figure 7:
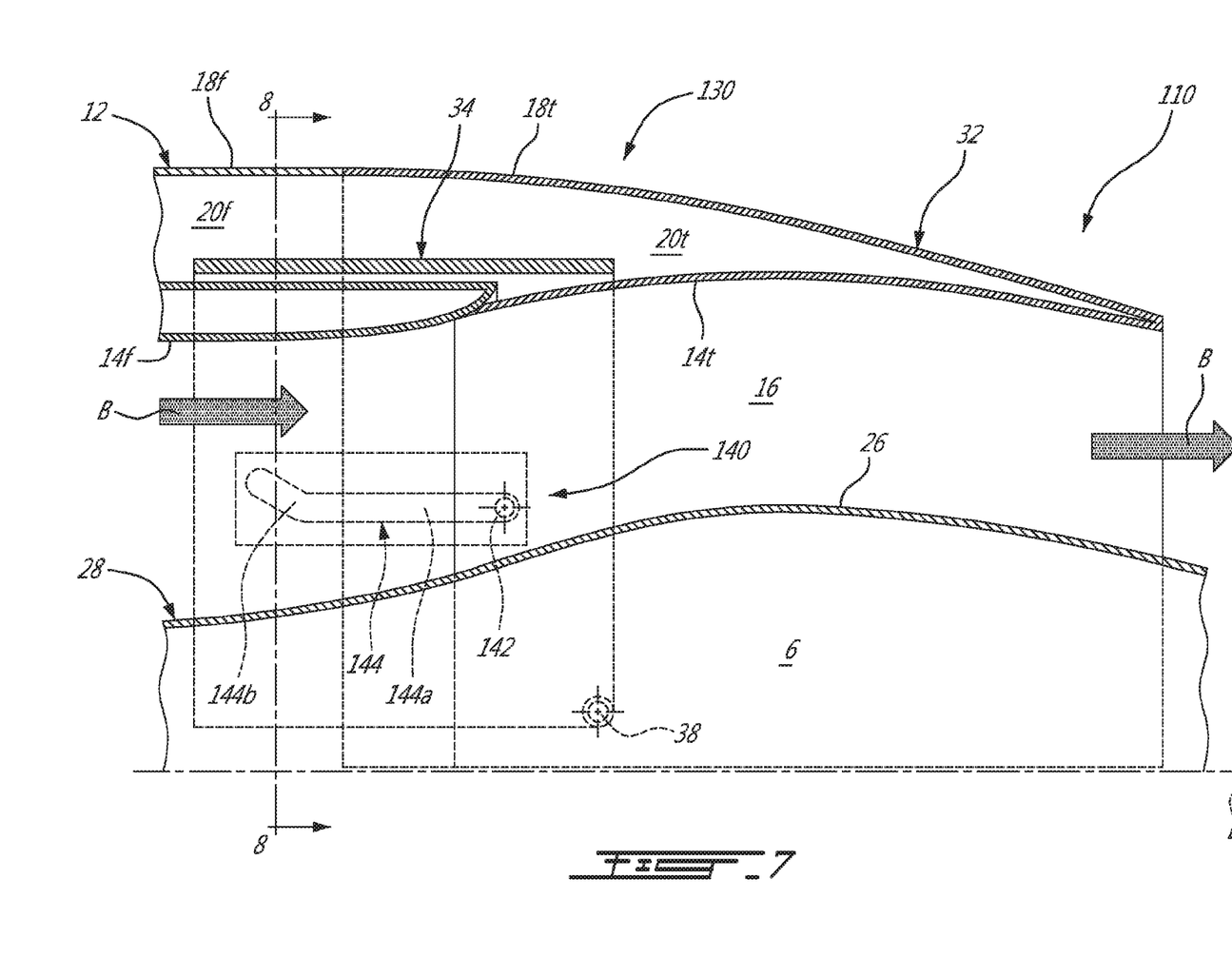
FIG. 7 is a schematic side cross-sectional view of part of another nacelle of an aircraft such as shown in FIG. 1, including a thrust reverser in accordance with another particular embodiment, the thrust reverser being in a closed configuration.
Figure 8:
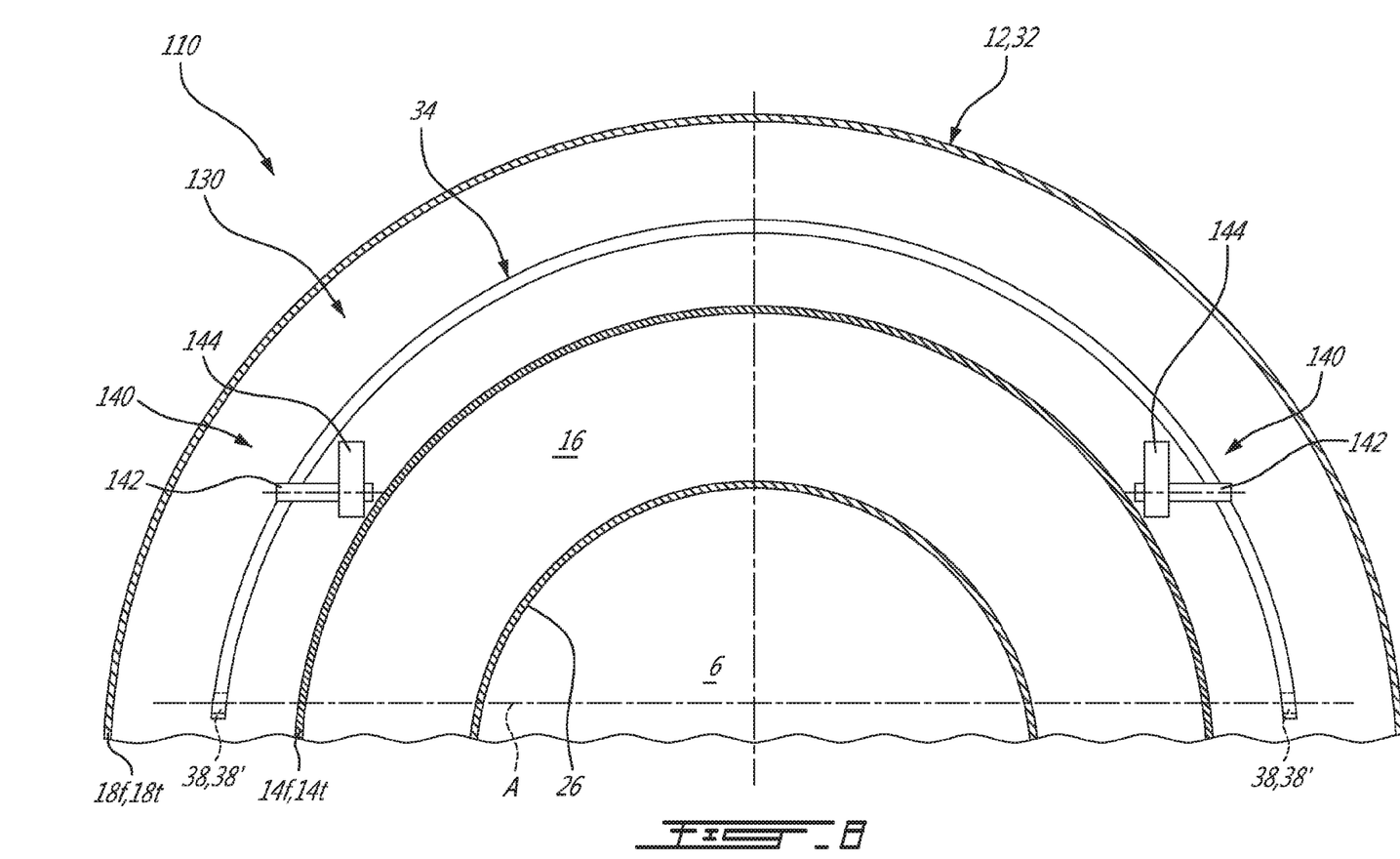
FIG. 8 is a schematic rear cross-sectional view of the nacelle of FIG. 7 with the thrust reverser in the closed configuration, taken along line 8-8.
Figure 9:
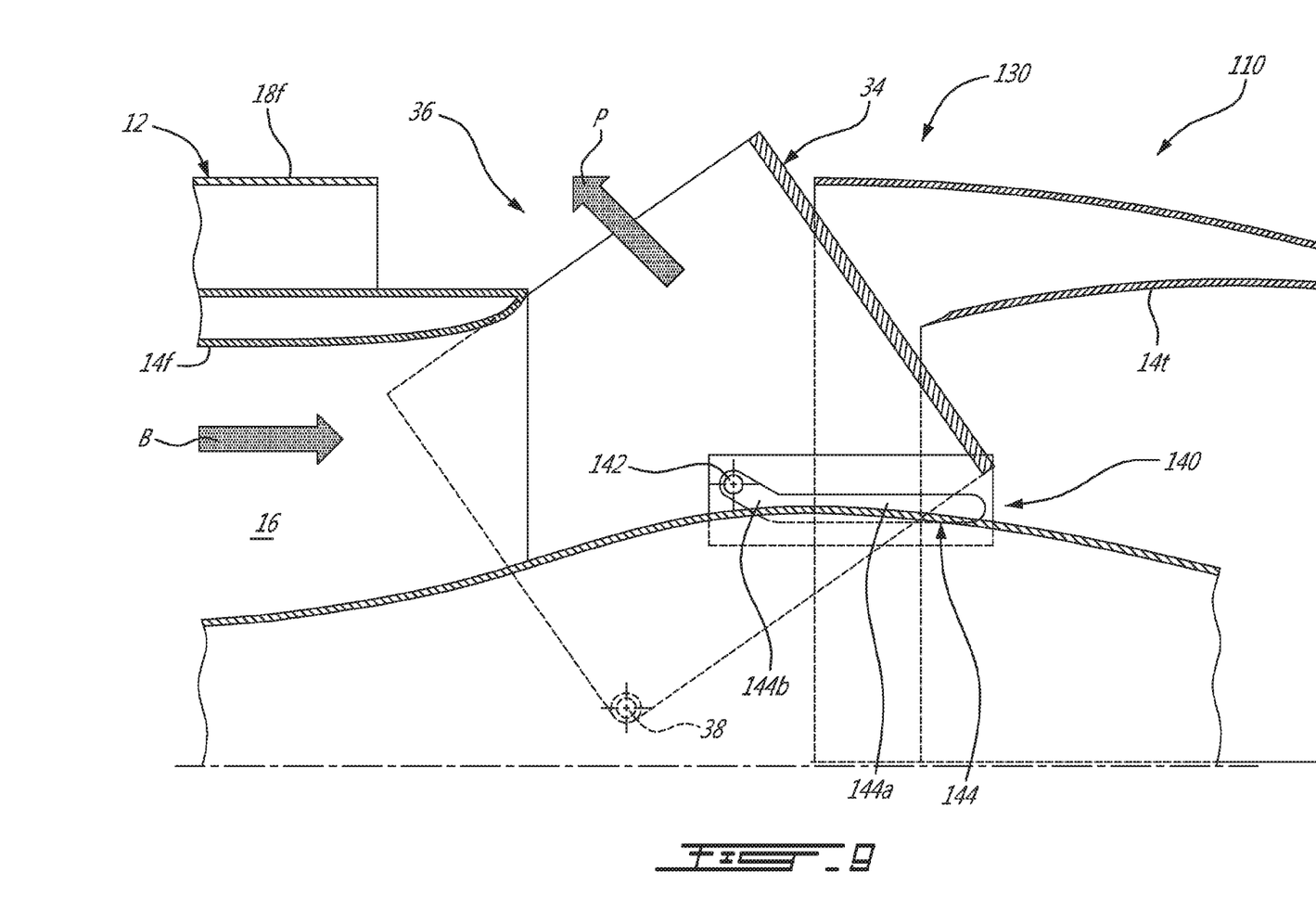
FIG. 9 is a schematic side cross-sectional view of the nacelle of FIGS. 7-8, showing the thrust reverser in a deployed configuration.

Referring to FIGS. 7-9, a nacelle 110 according to another embodiment is generally shown, where elements similar to that of the nacelle 10 of FIGS. 2-6c are identified by the same reference numerals and will not be further described herein. The nacelle 110 differs from the previously shown and described nacelle 10 in that the track 144 of the sliding connection 140 is connected to the translating cowl 32 and the engagement member 142 protrudes from the blocking panel 34. Accordingly, the second portion 144b of the track 144 extends from the first portion 144a away from the longitudinal axis L, and is located in front of the first portion 144a. Similarly to the thrust reverser 30 described above, the thrust reverser 130 of FIGS. 7-9 is configurable between the closed configuration (FIGS. 7-8) and the deployed configuration (FIG. 9) by the motion of the translating cowl 32 along the longitudinal axis L, with the interaction between the engagement member 142 and the track 144 causing the blocking panel 34 to remain in the stowed position between the closed configuration and an intermediate configuration as the engagement member 142 slides within the first, longitudinal portion 144a of the track 144, and to pivot about its pivot connection 38 with the outer casing 12 between the stowed and the pivoted positions as the engagement member 142 slides within the second, angled portion 144b of the track 144.

In a particular embodiment, the thrust reverser 30, 130 can thus be deployed by moving the translating cowl 32 away from the outer casing 12 along the longitudinal axis L of the casing 12 until the translating cowl 32 reaches the open position; this includes moving the translating cowl 32 away from the outer casing 12 without moving the blocking panel 34 relative to the outer casing 12 until the translating cowl 32 reaches an intermediate position, with the blocking panel 34 remaining radially outward of the bypass passage 16 and the engagement member 42, 142 sliding in the portion of the track 44a, 144a extending parallel to the longitudinal axis L, and then moving the translating cowl 32 away from the outer casing 12 from the intermediate position to the open position to pivot the blocking panel 34 about the pivot connection 38 by sliding the engagement member 42, 142 in the portion of the track 44b, 144b extending non-parallel to the longitudinal axis L, with the blocking panel 34 pivoting to the deployed position. The translating cowl 32 moves rearwardly away from the outer casing 12 to reach the open position.

In a particular embodiment, the blocking panel 34 is pivoted until it protrudes through the opening 36 between the translating cowl 32 and the outer casing 12.

The sliding connection 40, 140 thus provides a mechanical link between the translating cowl 32 and the blocking panel 34 which allows a constant linear motion of the translating cowl 32 while allowing the blocking panel 34 to remain stationary during part of the linear motion of the translating cowl 32 and to pivot during the remaining part of the linear motion of the translating cowl 32. In a particular embodiment, the sliding connection 40, 140 and the pivot connection 38 support the blocking panel 34 while remaining at all times radially outward of the outer wall 14f, 14t of the casing 12 and of the thrust reverser 30, 130, i.e. while remaining outside of the bypass passage 16. The blocking panel 34 also remains outside of the bypass passage 16 when not deployed. The thrust reverser 30, 130 accordingly does not impact the bypass flow B when in the closed configuration, i.e. during normal flight operations.

In a particular embodiment, the thrust reverser 30, 130 with the sliding connection 40, 140 provides for low drag and thus improved engine/aircraft performance, reduced cost and weight due to a reduced number of parts, and/or reduced maintenance costs due to the reduced number of parts, when compared with a thrust reverser including drag links.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A nacelle for an aircraft, comprising:
an outer casing having a longitudinal axis;
a thrust reverser including:
  a translating cowl, the outer casing and translating cowl cooperating to define an outer boundary of a bypass passage configured to surround an engine, the translating cowl movable relative to the outer casing along the longitudinal axis between a closed position and an open position, the translating cowl in the open position being axially spaced from the outer casing so as to define an opening between the translating cowl and the outer casing; and
  a blocking panel pivotable about a pivot connection between a stowed position and a pivoted position, the blocking panel in the pivoted position extending within the bypass passage adjacent the opening to direct a flow toward the opening;
wherein the blocking panel is connected to the translating cowl by a sliding connection including an engagement member slidingly engaged in a track, the track having a first portion parallel to the longitudinal axis and a second portion non-parallel to the longitudinal axis and extending from the first portion toward the longitudinal axis, the track being connected to the blocking panel, the engagement member protruding from the translating cowl;
wherein motion of the translating cowl along the longitudinal axis slides the engagement member within the track, the motion of the translating cowl being performed without moving the blocking panel when the engagement member is within the first portion of the track, the motion of the translating cowl causing the blocking panel to pivot about the pivot connection when the engagement member is within the second portion of the track.

2. The nacelle as defined in claim 1, wherein the translating cowl abuts the outer casing when in the closed position.

3. The nacelle as defined in claim 1, wherein the blocking panel is connected to the outer casing by the pivot connection.

4. The nacelle as defined in claim 1, wherein the blocking panel is located radially outwardly of the bypass passage when in the stowed position.

5. The nacelle as defined in claim 4, wherein the blocking panel extends in part within the translating cowl and in part within the outer casing when the blocking panel is in the stowed position and the translating cowl is in the closed position.

6. The nacelle as defined in claim 1, wherein the blocking panel is arcuate, the pivot connection including two circumferentially spaced pivots defining a pivot axis orthogonal to the longitudinal axis, the sliding connection being positioned circumferentially between the two pivots.

7. The nacelle as defined in claim 1, wherein the pivot connection is located radially outwardly of the bypass passage.

8. The nacelle as defined in claim 1, wherein the pivot connection is located aft of the track when the blocking panel is in the stowed position.

9. The nacelle as defined in claim 1, wherein the blocking panel protrudes through the opening when the blocking panel is in the pivoted position.

10. The nacelle as defined in claim 1, wherein the blocking panel includes a forward end and a rear end, the forward end being located radially outwardly of the rear end when the blocking panel is in the pivoted position.

11. A nacelle for an aircraft, comprising:
an outer casing having a longitudinal axis;
a translating cowl cooperating with the outer casing to define an outer boundary of a bypass passage configured to surround an engine, the translating cowl movable relative to the outer casing along the longitudinal axis;
a blocking panel connected to the outer casing by a pivot connection and connected to the translating cowl by a sliding connection, the sliding connection including an engagement member slidingly engaged in a track, the track having a first portion parallel to the longitudinal axis and a second portion non-parallel to the longitudinal axis and extending from the first portion toward the longitudinal axis, the track being connected to the blocking panel, the engagement member protruding from the translating cowl;
wherein the translating cowl and the blocking panel define at least part of a thrust reverser selectively configurable between:
  a closed configuration where the translating cowl abuts the outer casing, the blocking panel has a stowed position radially outwardly of the bypass passage, and the engagement member is located in the first portion of the track,
  a deployed configuration where the translating cowl is spaced a first distance from the outer casing so as to define an opening therebetween, the blocking panel has a pivoted position within the bypass passage adjacent the opening to direct a flow toward the opening, and the engagement member is located in the second portion of the track, the blocking panel pivoting about the pivot connection to move between the stowed and pivoted positions, and
  an intermediate configuration between the closed and deployed configurations, wherein in the intermediate configuration, the translating cowl is spaced a second distance smaller than the first distance from the outer casing, the blocking panel is in the stowed position, and the engagement member is located at a junction between the first and second portions of the track.

12. The nacelle as defined in claim 11, wherein the blocking panel is arcuate, the pivot connection including two circumferentially spaced pivots defining a pivot axis orthogonal to the longitudinal axis, the sliding connection being positioned circumferentially between the two pivots.

13. The nacelle as defined in claim 11, wherein the pivot connection is located radially outwardly of the bypass passage.

14. The nacelle as defined in claim 11, wherein the pivot connection is located aft of the track when the blocking panel is in the stowed position.

15. The nacelle as defined in claim 11, wherein the blocking panel protrudes through the opening when the blocking panel is in the pivoted position.

16. The nacelle as defined in claim 11, wherein the blocking panel extends in part between walls of the translating cowl and in part between walls of the outer casing when the thrust reverser is in the closed configuration.

17. A nacelle for an aircraft, comprising:
an outer casing having a longitudinal axis;
a thrust reverser including:
 a translating cowl, the outer casing and translating cowl cooperating to define an outer boundary of a bypass passage configured to surround an engine, the translating cowl movable relative to the outer casing along the longitudinal axis between a closed position and an open position, the translating cowl in the open position being axially spaced from the outer casing so as to define an opening between the translating cowl and the outer casing; and
 a blocking panel pivotable about a pivot connection between a stowed position and a pivoted position, the blocking panel in the pivoted position extending within the bypass passage adjacent the opening to direct a flow toward the opening;
 wherein the blocking panel is connected to the translating cowl by a sliding connection including an engagement member slidingly engaged in a track, the track having a first portion parallel to the longitudinal axis and a second portion non-parallel to the longitudinal axis and extending from the first portion away from the longitudinal axis, the track being connected to the translating cowl, the engagement member protruding from the blocking panel;
wherein motion of the translating cowl along the longitudinal axis slides the engagement member within the track, the motion of the translating cowl being performed without moving the blocking panel when the engagement member is within the first portion of the track, the motion of the translating cowl causing the blocking panel to pivot about the pivot connection when the engagement member is within the second portion of the track.

18. A nacelle for an aircraft, comprising:
an outer casing having a longitudinal axis;
a translating cowl cooperating with the outer casing to define an outer boundary of a bypass passage configured to surround an engine, the translating cowl movable relative to the outer casing along the longitudinal axis;
a blocking panel connected to the outer casing by a pivot connection and connected to the translating cowl by a sliding connection, the sliding connection including an engagement member slidingly engaged in a track, the track having a first portion parallel to the longitudinal axis and a second portion non-parallel to the longitudinal axis and extending from the first portion away from the longitudinal axis, the track being connected to the translating cowl, the engagement member protruding from the blocking panel;
wherein the translating cowl and the blocking panel define at least part of a thrust reverser selectively configurable between:
 a closed configuration where the translating cowl abuts the outer casing, the blocking panel has a stowed position radially outwardly of the bypass passage, and the engagement member is located in the first portion of the track,
 a deployed configuration where the translating cowl is spaced a first distance from the outer casing so as to define an opening therebetween, the blocking panel has a pivoted position within the bypass passage adjacent the opening to direct a flow toward the opening, and the engagement member is located in the second portion of the track, the blocking panel pivoting about the pivot connection to move between the stowed and pivoted positions, and
 an intermediate configuration between the closed and deployed configurations, wherein in the intermediate configuration, the translating cowl is spaced a second distance smaller than the first distance from the outer casing, the blocking panel is in the stowed position, and the engagement member is located at a junction between the first and second portions of the track.

\* \* \* \* \*